April 15, 1930.  F. A. STEVENS  1,754,840
OPHTHALMIC MOUNTING AND METHOD
Filed Oct. 16, 1924
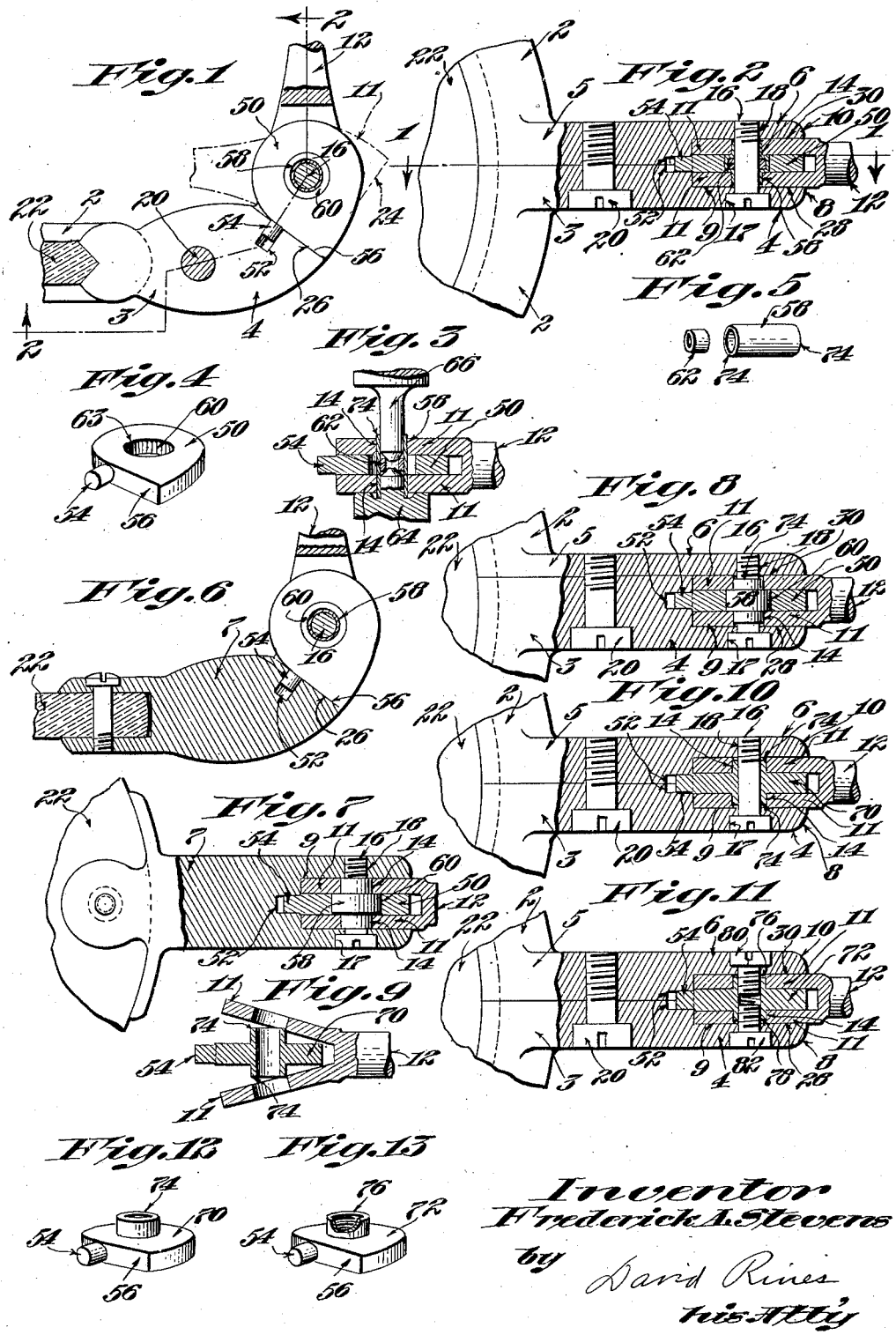

Patented Apr. 15, 1930

1,754,840

UNITED STATES PATENT OFFICE

FREDERICK ARTHUR STEVENS, OF PROVIDENCE, RHODE ISLAND

OPHTHALMIC MOUNTING AND METHOD

Application filed October 16, 1924. Serial No. 743,957.

The present invention relates to ophthalmic mountings, more particularly to double-ear temples and temple connections for spectacles, and to methods of making the same.

The objects of the invention are to improve upon ophthalmic mountings of the above-described character, reducing their cost of manufacture, increasing their ruggedness, simplifying their construction, rendering them more attractive in appearance, and eliminating looseness in the temple joints.

With these ends in view, the invention consists of the improved ophthalmic mounting and method hereinafter described, illustrated in the accompanying drawings and defined in the appended claims.

In the drawings, Fig. 1 is a fragmentary section, taken substantially upon the line 1—1 of Fig. 2, looking in the direction of the arrows, of a pair of spectacles constructed according to a preferred embodiment of the present invention, a temple being shown as occupying two positions in dotted and in full lines, respectively; Fig. 2 is a section taken upon the line 2—2 of Fig. 1, looking in the direction of the arrows; Fig. 3 is a section similar to Fig. 2, illustrating a preferred method of manufacture; Figs. 4 and 5 are detail views; Fig. 6 is a section similar to Fig. 1 of a modification; Fig. 7 is a section similar to Fig. 2 of the modification shown in Fig. 6; Fig. 8 is a section similar to Fig. 2 of another modification; Fig. 9 is a view illustrating a method of manufacturing the modified constructions illustrated in Figs. 10 and 11; Figs. 10 and 11 are sections similar to Fig. 2 of additional modifications; and Figs. 12 and 13 are detail views corresponding to Fig. 4 of bearing plates employed in the modifications of Figs. 10 and 11, respectively.

Spectacles of a well-known type comprise split rims 2 having end pieces 4 and 6 the inner portions 3 and 5 of which, where they are secured to the rims, are plate-like in form, and the outer or terminal portions 8 and 10 of which are reduced in thickness, as shown in Figs. 2, 10 and 11, so as to form a pocket 9 for the flattened, pivot ears 11 of a temple 12. Each ear 11 is received within a hinge recess, as illustrated, the two hinge recesses constituting the pocket 9. One of the end pieces may be of uniform thickness throughout, as shown in Fig. 8, the pocket 9 being formed by cutting away the other end piece only. The pivot ears 11 are provided with eyes 14, whereby the temple may be pivotally mounted over a retaining dowel, screw or other member 16, Figs. 1, 2 and 6 to 10. As is illustrated in some of these figures, the member 16 may be a screw that enters freely an opening 17 in the end piece 4, and is threaded into a screw-threaded opening 18 in the end piece 6. The end pieces are secured together by a screw 20 to maintain a lens 22 in position within the rim. Where mountings of the rimless type are employed, illustrated in Figs. 6 and 7, in which the temple 12 is secured to a single end piece 7, the pocket 9 is formed by cutting into this end piece, and the openings 17 and 18 are formed on opposite sides of the pocket, as shown, in the single end piece. To avoid circumlocution of language, the single end piece of Fig. 7 will be included in the terminology hereinafter employed, "end pieces." The ears 11 of the temple 12 may be pivotally mounted in the pocket 9, or removed from the pocket, by means of the screw 16. The pivot ears 11 are provided with projecting points 24 adapted to engage the limiting wall 26 of the pocket 9, thereby to limit the pivotal movement of the temple about the dowel. One of the projecting points 24 is shown in dotted lines in Fig. 1.

The ears 11, during such pivotal movement, bear frictionally against the inner faces 28 and 30 of the end-piece terminals 8 and 10. The temple may be held against loose, swinging movement by suitably tightening the screw 16. Such tightening, however, tends to bend the ears 11 towards each other, with the result that the faces 28 and 30 cannot lie flat upon the faces of the temple ears 11 which they respectively engage. The pressure exerted upon these ears is not, therefore, uniform, resulting in a loose temple connection.

To overcome this defect, a plate or washer 50 is interposed between the ears 11. The thickness of the plate 50 is substantially the same as the distance between the inner faces of the ears 11. The presence of the plate 50 prevents the bending of the ears 11 towards each other when the inner faces 28 and 30 of the end-piece terminals 8 and 10 are pressed into tight engagement with the outer faces of the ears 11 by the screw 16.

The plate 50 may, furthermore, be utilized to provide additional bearing surfaces for the ears 11. The flat faces 28 and 30 of the terminal portions 8 and 10 then contact smoothly with, and press inwardly upon, the flat outer faces of the bent ears and the plate 50 presses outwardly upon the corresponding inner faces of the ears. To this end, it is necessary that the plate 50 be maintained stationary when the temple is pivotally actuated. This result may be effected by providing one or both end pieces and the plate 50 with co-operating locking mechanism to prevent their relative rotation. According to the illustrated embodiments of the invention, one or both end pieces is provided with a recess or oppositely disposed recesses 52, and the plate 50 with a projection or projections 54 that are adapted to enter the recesses. One end piece only is recessed in the constructions of Figs. 6, 7, and 8, but both end pieces are provided with recesses in the other constructions. The same result may be effected by providing the plate 50 with a shoulder 56 that is adapted to engage the limiting wall 26 of the pocket 9.

To prevent loss of the plate 50, it is desirable to mount it permanently upon the temple 12. A preferred method of making a temple structure of this character will now be described. A sleeve 58, illustrated in its original form in Fig. 5, is first inserted in the eyes 14 of the ears 11 and through an opening 60 of the plate 50, as is illustrated in Fig. 3. A ring 62 is then inserted into the sleeve and is caused to rest upon a suitable tool 64 in a position opposite to the opening 60 of the plate 50. The outside diameter of the sleeve 58 is substantially the same as the diameter of the eyes 14 of the ears 11, but the opening 60 is of greater diameter. The tool 64 and a tool 66 that is placed on the other side of the ring are now forced towards each other. As the tools are conically pointed, as shown in Fig. 3, they will enter the ring 62, causing it to expand. In so expanding, it will cause the sleeve to expand into the opening 60 of the plate 50, as is illustrated in Fig. 2, and into secure engagement with the plate 50. The fit of the sleeve in the eyes 14 will prevent deformation of the sleeve on both sides of the opening 60. The ring itself becomes locked in the expanded portion of the sleeve, and becomes, in effect, integrally connected with the plate 50 and the sleeve 58. To aid the locking effect, the plate 50 may be provided with teeth 63 along the opening 60. The temple 12, the plate 50, the sleeve 58 and the ring 62 are thus combined into a single, unitary structure. As the opening 60 is circular, there is nothing to prevent relative rotation of the temple and the plate 50. In practice, as the plate is held against rotation, as above described, the temple will rotate about the end portions or bushings 74 of the sleeve as a bearing. As the sleeve is maintained stationary with the plate 50, it will not bear against the screw 16 during the pivotal movement of the temple, and loosening of the screw 16 from such cause becomes eliminated.

The sleeve 58 and the plate 50 may be made integral, as illustrated at 70 in Figs. 9, 10 and 12 and at 72 in Figs. 11 and 13. To mount an integral structure of this character upon the temple it is preferable first to bend the ears 11 away from each other, as shown in Fig. 9. As the ears are brought back to normal position, the projecting sleeve ends 74 are guided into the eyes 14, within which they are loosely received, producing the structure illustrated in Figs. 10 and 11. A retaining screw 16 may be passed through the end pieces and the washer, as before described in connection with Figs. 1, 2, and 6 to 8, and about the sleeves or bushings 74, and the temple will pivot about the axis of the screw 16, as illustrated in Fig. 10, the washer and the bushings remaining stationary during the pivotal movement of the temple. The temple will not, however, bear directly against the screw 16, but about the projecting sleeve ends 74, about which the temple ears are journaled, thus eliminating a cause of loosening of the screw 16, as before described. If desired, the sleeve ends 74 may be threaded, as shown at 76, and 78, Figs. 11 and 13, and screws 80 and 82 may be inserted through openings in the end pieces and threaded into the threads 76 and 78. The screws are threaded in the same direction. Any possible loosening of one screw, as the screw 80, caused by possible slight turning of the plate 70, will immediately become compensated for by a corresponding tightening of the other screw. The tension of the temple is thus maintained uniform, its loosening being thus prevented.

According to the present invention, therefore, a temple construction is provided with a plurality of bearing surfaces so disposed that when mounted properly, the temple will not swing loosely from one position to another. The means for producing tension on the temple, such as the screws 16, 80 and 82, will not loosen. The temple will therefore remain in any position that it may happen to occupy, but is readily freely movable to any other position between its limits of movement. It is cheap to manufacture and very efficient in operation. It is readily adaptable to use with end pieces of uniform thickness, as illustrated in Figs. 2, 10 and 11, which are more easily, accurately and cheaply manufactured than end pieces of unequal thickness, as illustrated in Fig. 8. In fact, the end pieces may be of standard design, except that wider slots may be provided therein to produce a wider pocket 9 for receiving the double ears of the temple; and a wider slot can be cut more accurately and more economically than a narrower slot.

It will be understood that the invention is not restricted to the exact embodiments thereof that are herein illustrated and described, but that modifications may be made therein without departing from its spirit and scope as defined in the appended claims.

What is claimed is:

1. A temple for an ophthalmic mounting having end pieces, the said temple having rigid therewith a plurality of ears and a plate permanently mounted upon the temple between the ears as a unitary article, opposite faces of the plate being in contact with the ears and the plate being movable with respect to and between the ears.

2. A temple for an ophthalmic mounting having end pieces, the said temple having a plurality of ears and a plate permanently mounted pivotally upon the temple between the ears as a unitary article, opposite faces of the plate being in contact with the ears.

3. A temple for an ophthalmic mounting, the said temple having rigid therewith a plurality of ears each having an eye, a plate interposed in the space between the ears, the plate having an opening of greater diameter than the eyes, and a sleeve mounted in the eyes and extending into the opening.

4. In an ophthalmic mounting comprising two members having oppositely disposed portions, a third member having two ears pivotally mounted between the oppositely disposed portions, a plate permanently mounted upon the third member between the ears as a unitary article, the plate being movable with respect to and between the ears, and means for causing the oppositely disposed portions to engage the ears tightly.

5. In an ophthalmic mounting having end pieces, a temple having two ears pivotally mounted upon the end pieces, and a plate permanently mounted upon the temple between the ears, the plate being immovable relatively to the end pieces.

6. In an ophthalmic mounting having end pieces provided with oppositely disposed portions, a temple having two ears pivotally mounted upon the end pieces, a plate permanently mounted upon the temple between the ears, the plate being immovable relatively to the end pieces, and means for causing the oppositely disposed portions to engage the ears and the plate tightly.

7. An ophthalmic mounting having, in combination, a split lens rim having end pieces the terminal portions of which are reduced in thickness, a temple having ears mounted between the terminal portions, and a plate interposed between the ears, the plate being movable with respect to and between the ears.

8. An ophthalmic mounting having a plurality of ears, a plate permanently mounted upon the temple between the ears as a unitary article, opposite faces of the plate being in contact with the ears, the plate being movable with respect to and between the ears, and means for tensioning the relative movement of the ears and the plate.

9. In an ophthalmic mounting having end pieces, a member having a plurality of ears pivotally mounted upon the end pieces, and a plate permanently mounted upon the member between the ears as a unitary article, opposite faces of the plate being in contact with the ears, the plate being movable with respect to and between the ears.

10. In an ophthalmic mounting having end pieces, a member having a plurality of ears pivotally mounted upon the end pieces, a plate permanently mounted upon the member between the ears, and means for preventing movement of the plate relatively to the end pieces.

11. In an ophthalmic mounting having end pieces, a member having a plurality of ears pivotally mounted upon the end pieces, and a plate separate from the end pieces interposed between the ears, one of the said parts having a recess and another of the said parts having a projection lying in the recess to prevent movement of the plate relatively to the end pieces.

12. In an ophthalmic mounting having end pieces one of which is provided with a recess, a temple having a plurality of ears pivotally mounted upon the end pieces, and a plate separate from the end pieces interposed between the ears, the plate having a projection lying in the recess to prevent relative movement of the plate and the end pieces.

13. In an ophthalmic mounting having end pieces provided with recesses, a temple having a plurality of ears pivotally mounted in the recesses, and a plate permanently mounted upon the temple between the ears as a unitary article, the plate being immovable relatively to the end pieces.

14. In an ophthalmic mounting having end pieces provided with recesses, a temple having perforated ears mounted in the recesses, a perforated plate permanently mounted upon the temple between the ears, and means extending through the end pieces, the ears and the plate for pivotally securing the parts together, the plate being immovable relatively to the end pieces.

15. An ophthalmic mounting having a plurality of ears provided with eyes, and a unitary sleeve mounted in the eyes, the sleeve having rigid therewith a plate mounted between the ears.

16. An ophthalmic mounting having a plurality of ears provided with eyes, a sleeve mounted in the eyes, and a plate rigidly mounted about the sleeve between the ears.

17. An ophthalmic mounting having a plurality of ears provided with eyes, a sleeve mounted in the eyes, and a plate mounted about the sleeve between the ears, an intermediate portion of the sleeve extending between the ears to lock the sleeve and the plate to the mounting.

18. An ophthalmic mounting having a plurality of perforated ears, a sleeve mounted in the perforations of the ears, a bearing mounted about the sleeve between the ears, an intermediate portion of the sleeve extending between the ears to lock the sleeve and the bearing to the mounting, and a ring in the said intermediate portion of the sleeve.

19. In an ophthalmic mounting having end pieces provided with oppositely disposed portions each provided with an opening, a temple having a plurality of ears each provided with an eye, a sleeve mounted in the eyes, a plate mounted about the sleeve between the ears, and means extending through the openings and the sleeve, the temple being adapted to pivot about the sleeve.

20. In an ophthalmic mounting having end pieces provided with oppositely disposed portions each provided with an opening, a temple having a plurality of ears each provided with an eye, an interiorly threaded sleeve mounted in the eyes, a plate mounted about the sleeve between the ears, and screws extending through the openings and threaded into the sleeve perforations, the temple being adapted to pivot about the sleeve.

21. An ophthalmic mounting comprising a sleeve an intermediate portion of which is expanded, and a ring mounted in the expanded portion of the sleeve.

22. A method of making an ophthalmic mounting that comprises positioning a ring in a sleeve, holding the sleeve against deformation on both sides of the ring, and expanding the ring, whereby the sleeve is deformed by the ring between the held portions and the ring is locked in position in the sleeve.

23. A method of making a spectacle temple having two ears each provided with an eye and with a space between the ears, the said method comprising inserting a perforated plate between the ears, the perforation in the plate being of greater dimension than the dimension of the eyes, positioning a sleeve in the perforation of the plate and the eyes, positioning a ring in the sleeve adjacent to the said space, and expanding the ring, whereby the sleeve is deformed by the ring into the space and the parts are locked together.

24. An ophthalmic mounting comprising a lens rim end-piece having a hinge recess, a temple having pivot ears mounted in said recess, a washer positioned between said ears, and a bushing carried by said washer and loosely received within one of said pivot ears.

25. In an ophthalmic mounting, the combination with a lens rim endpiece having a hinge recess, of a temple having pivot ears mounted in said recess, a washer between said ears and a bushing carried by said washer and loosely received within one of said ears.

26. In an ophthalmic mounting, a temple adapted to be secured within a lens rim endpiece, said temple comprising a pair of spaced hinge ears, a washer loosely positioned between said spaced ears, and a bushing secured within said washer and loosely received within one of said ears.

27. An ophthalmic mounting comprising a lens rim endpiece having a hinge recess, a temple having pivot ears in said recess, a washer positioned between said ears, a bushing secured to said washer and loosely received within one of said ears, and a retaining screw passing through said endpiece and bushing, said washer and bushing remaining stationary during movement of said temple ears.

28. An ophthalmic mounting having, in combination, a split lens rim having end pieces, a temple having ears pivotally mounted between the end pieces, and oppositely threaded means for maintaining the temple tensioned during the pivotal movement of the temple.

In testimony whereof, I have hereunto subscribed my name this 14th day of October, 1924.

FREDERICK A. STEVENS.